United States Patent [19]

Pickles

[11] 4,040,591
[45] Aug. 9, 1977

[54] POWER SEAT MECHANISM

[75] Inventor: Joseph Pickles, Birmingham, Mich.

[73] Assignee: Ferro Manufacturing Corporation, Detroit, Mich.

[21] Appl. No.: 606,540

[22] Filed: Aug. 21, 1975

[51] Int. Cl.² .................. A45D 19/04; F16M 13/00
[52] U.S. Cl. .................................. 248/394; 248/396; 248/429
[58] Field of Search ............. 248/393, 394, 396, 395, 248/429, 430; 280/150 B; 296/65 R, 65 A; 297/216, 384

[56] References Cited
U.S. PATENT DOCUMENTS

| 3,022,035 | 2/1962 | Pickles | 248/395 |
|---|---|---|---|
| 3,089,676 | 5/1963 | Pickles | 248/394 |
| 3,124,332 | 3/1964 | Heyl | 248/430 X |
| 3,157,441 | 11/1964 | Pickles | 248/430 X |
| 3,335,995 | 8/1967 | Pickles | 248/394 |
| 3,365,163 | 1/1968 | Pickles | 248/394 X |
| 3,712,573 | 1/1973 | Pickles | 248/394 |

Primary Examiner—Lawrence J. Staab
Attorney, Agent, or Firm—Whittemore, Hulbert & Belknap

[57] ABSTRACT

An adjustable vehicle seat construction in which motor means is connected by a bracket to the seat slide, which also carries transmission mechanism for adjusting the position of the seat. The seat adjusting mechanism comprises interconnected levers at opposite sides interconnected by a torsion tube pivotally connected to side elements of the seat frame by elongated pins in driving connection therewith. In addition, mounting brackets are provided carrying carriage supports on which elongated carriage slides are longitudinally slidable. The mounting brackets at their forward ends include special abutment means engageable by the forward end of the carriage supports under abnormal stress such as may occur in collision.

2 Claims, 5 Drawing Figures

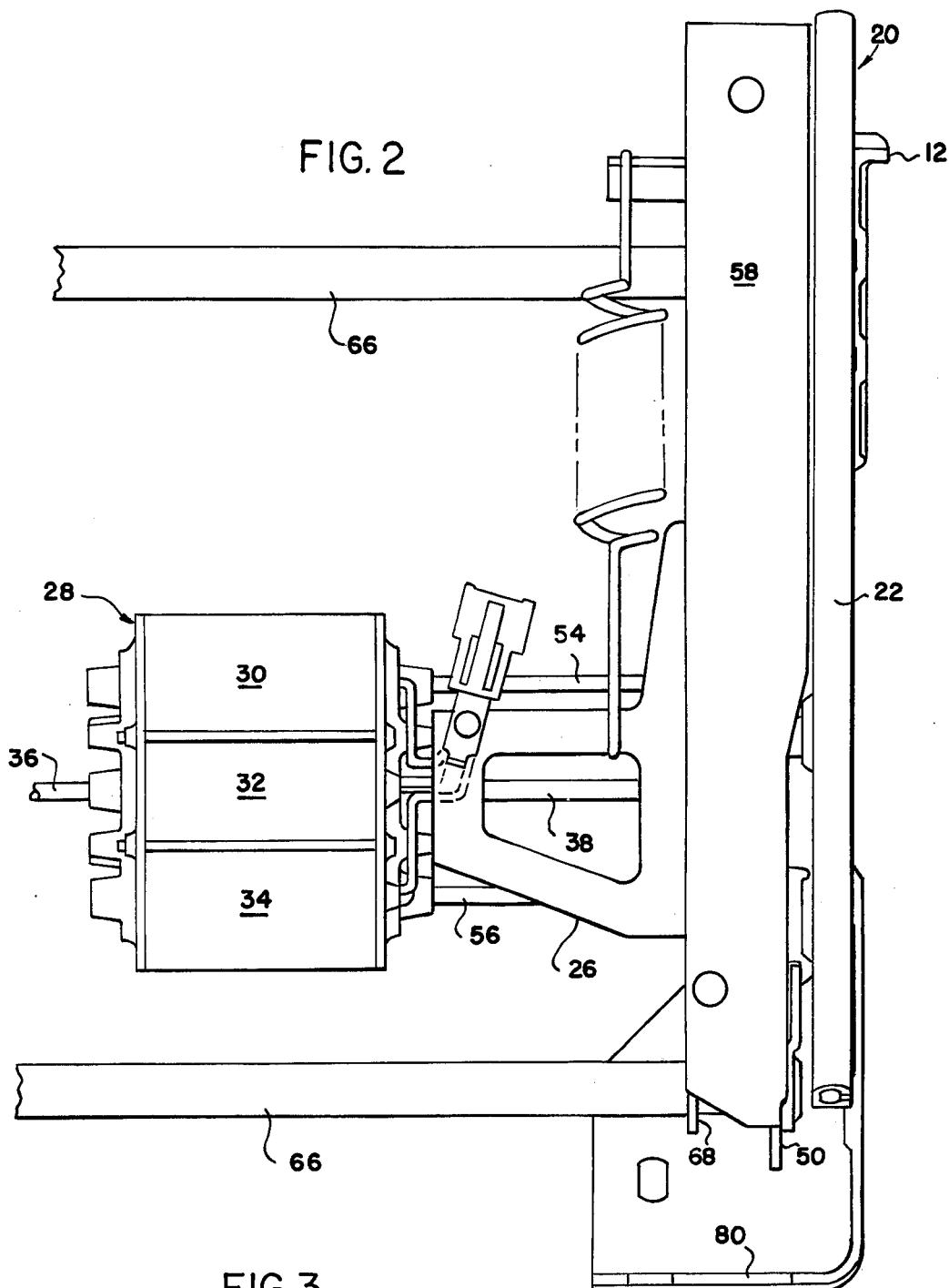
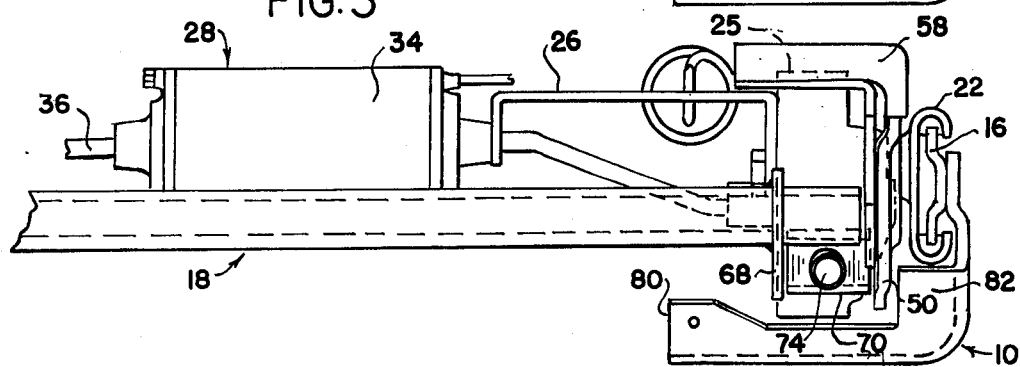

POWER SEAT MECHANISM

BRIEF SUMMARY OF THE INVENTION

The seat construction is of the familiar type referred to as a six-way seat in which stationary front and rear mounting bases are provided with carriage supports on which generally C-shaped carriage slides are longitudinally slidable. The carriage is movable forwardly and rearwardly. The vehicle seat is connected to the carriage adjacent the forward and rear edges by bellcranks or levers which are pivoted to provide for independent swinging movement, thus imparting selective upward and downward movement of the forward and rear edges of the vehicle seat.

In accordance with the present invention three reversible electric motors are provided in a compact unitary construction mounted on the carriage by a mounting bracket extending from one side thereof. One of the motors is provided with drive shafts extending from opposite ends thereof transversely of the vehicle and connected through suitable transmission means to screws which in turn are connected to nuts fixed to the mounting bases.

The other two motors have drive shafts extending therefrom in one direction only toward one side of the seat construction and each of these is connected through suitable transmission means to a nut and screw type actuator which in turn is connected to a bellcrank or lever for effecting generally up and down movement of the rear edge and the front edge of the seat.

Accordingly, the carriage is movable fore and aft to provide corresponding adjustment of the seat, and the seat construction itself is adjustable relative to the carriage by means of the bellcranks or levers previously described.

The construction is simplified by providing separate carriage slides at opposite ends of the seat construction and the motor mechanism is connected to one of these carriage slides by a bracket extending inwardly so as to position the motors substantially midway between the ends of the seat.

In order to provide for ready tilting adjustment of the seat or vertical movement thereof (by effecting simultaneous movement of the front and rear bellcranks or levers), a torsion tube extends transversely of the carriage and is connected to substantially identical bellcranks or levers at opposite ends thereof. To stabilize this torsion tube, it is connected to the carriage slides by elongated pins extending into the open ends of the torsion tube beyond the zones at which the bellcranks or levers are connected thereto.

The present seat construction is particularly designed to absorb excessive stresses such as may be developed by collision or the like. For this purpose, the forward mounting bases are provided with abutment means normally spaced slightly below the path of movement of the carriage slides, and engageable thereby upon yielding of the carriage supports as a result of stresses transmitted to the seat construction by collision or the like.

BRIEF DESCRIPTION OF THE DRAWINGS

FIG. 2 is a fragmentary plan view of the seat construction.

FIG. 3 is a fragmentary end view of the seat construction viewed from the front end thereof.

DETAILED DESCRIPTION

Figure 1:
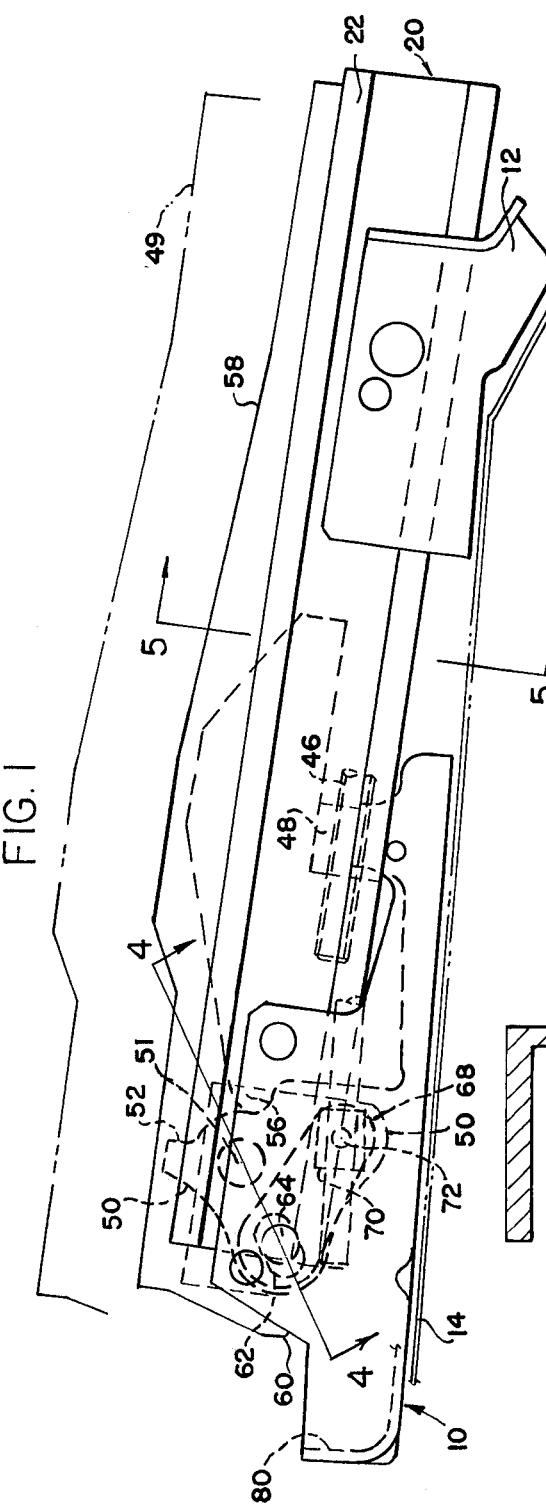
FIG. 1 is a partial side elevation of the seat construction illustrating the relationship of parts.
Figure 5:
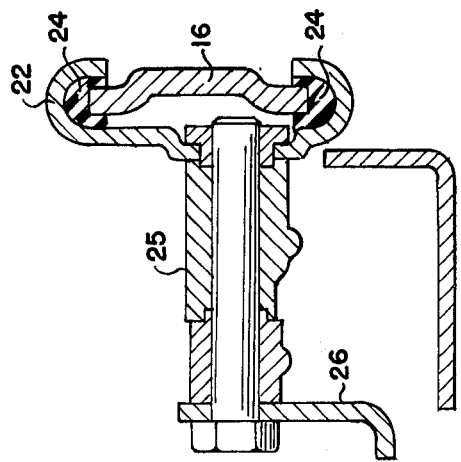
FIG. 5 is a sectional view of the line 5—5, FIG. 1.

Referring now to the drawings, the seat construction comprises a pair of front mounting bases 10 and a pair of rear mounting bases 12 suitably secured to the floor 14 of a motor vehicle. These bases are formed of sheet metal and as best illustrated in FIG. 3, where the front mounting base 10 is seen, they include carriage supports 16.

The carriage itself, indicated generally at 18 in FIG. 3, comprises interconnected longitudinally elongated slide structures 20 to which are connected carriage slides 22 of generally C-shaped cross-section. Carriage supports 16 extend into the slides which are preferably provided with low friction inserts as indicated at 24.

One of the slide structures 20, as illustrated in FIGS. 2 and 3, is provided with a transmission housing 25 carrying an inwardly extending motor mounting bracket 26 which in turn carries motor mechanism indicated generally at 28 comprising three independent separately reversible motors 30, 32 and 34. Each of the slide structures 20 at each side of the carriage 18 comprises the carriage slides 22 of generally C-shaped cross section at opposite sides thereof, each of which receives a pair of the carriage supports 16. Accordingly, the carriage 18 is movable longitudinally of the vehicle with side structures 20 and slides 22.

The mechanism for effecting this movement of the carriage slides comprises drive shafts 36 and 38 extending from opposite ends of the intermediate motor 32, the axis of which extends transversely of the motor vehicle. Opposite ends of the drive shafts or cables are connected to suitable transmission mechanism in housing 25 where rotary motion of the drive shaft is connected through a worm and worm gear (not shown) to screw shafts 46 in threaded engagement through nuts 48 carried by the forward mounting bases 10. Rotation of the screw shafts 46 in opposite directions of course effects forward or rearward movement of the slide structures 20 and carriage 18.

In order to provide for up and down independent movement of the forward and rear edges of the seat construction indicated in broken lines at 49, bell cranks or levers more or less diagrammatically indicated at 50 are provided, each of which is pivotally mounted on one of the slides 22 as indicated at 51. Pivotal movement of the bell crank 50 is limited to about 90° by abutment surfaces 52 and 54 cooperating with an abutment 56 affixed to the slide 22.

Figure 4:
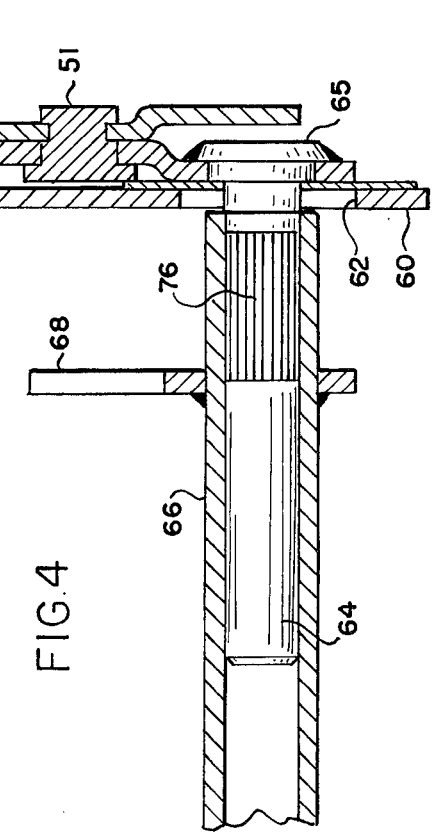
FIG. 4 is a section on the line 4—4, FIG. 1.

The seat construction 49 is rigidly secured at opposite ends to seat support bar 58 which have depending legs at the front and rear ends thereof, a portion of the front leg being indicated at 60. Legs 60 as best seen in FIG. 4 are provided with elongated slots 62 which slidably receive pins 64, so that swinging movement of the bell crank 50 in opposite directions will raise or lower the front end of the bar 58. The slot 62 is elongated so that this motion may take place as a pivotal motion about a corresponding pin adjacent the rear end of the seat bar without binding.

In order to effect the required swinging movement of the bell crank 50 screw and nut devices are provided at each end of the slide structures. Since these mechanisms are substantially identical only the mechanism at the forward end will be described, this mechanism being best seen in FIGS. 1 and 3.

Since it is desirable to provide identical lift mechanism at both ends of the seat, it will be understood that a bell crank will be provided at opposite ends of the seat and these are required to move in unison by a torsion tube 66. Fixed to the torsion tube 66 is a nut support arm 68, and an actuating nut 70 is pivoted between arm 68 and the bell crank 50, the pivot means being indicated at 72. The forward flexible drive shaft 56 connects the motor 34 to a suitable transmission such for example as a worm and worm gear in the transmission housing 25, and this in turn drives forwardly extending shaft 74 which is threadedly engaged in the nut 70. Accordingly, as the shaft 74 rotates, bell crank 50 is rotated in one direction or the other about pivot connection 51 and pin 64 effects corresponding generally up and down movement of the forward end of the seat support bar 58.

Lift pins 64 each have a head 65 which is affixed, as by welding, to the bell crank 50. The pin 64 extend into the end of the torsion tube 66 and is provided with a serrated portion 76 which prevents relative turning movement between the tube 66 and the serrated portion 76 of the pin 64. In addition, the pin 64, as best seen in FIG. 4, extends well beyond the zone at which the nut arm 68 is fixedly attached to the torsion tube. This reinforces the tube and provides a particularly strong and rigid interconnection between the bell cranks at opposite sides of the seat.

The present construction is designed to withstand stresses such as may be imposed by collision. It will be understood that in the usual case the shoulder harness provided for the safety of an occupant of the vehicle is attached to the seat and in the event of collision, the seat is subjected to forces tending to separate it from the seat supporting and adjusting mechanism. Since a connection between the seat construction and its support includes the seat support elements 16 carried by the brackets 10 and 12 and extending into the C-shaped slides 22, these forces tend to distort or destroy these connections. In addition, the forces applied to the seat construction generally may be considered as including forward tilting movement of the seat including an upward movement of the rear edge of the seat and a corresponding downward movement of the front edge of the seat.

In order to provide means effective to oppose considerable resistance to downward movement of the front end of the seat the front seat supporting bracket 10 has the front portion thereof bent upwardly as indicated at 80 and this portion is cut away so as to provide an abutment shoulder 82 which is slightly separated from the bottom edge of the slide 22 when the slide is in its forward position. Thus, as forces developed by a collision tend to cause the front end of the seat slide 22 to move downwardly, which movement might be permitted by separation of the seat support elements 16 from the bracket 10, slight initial movement will cause the front end of the slide 22 to engage the upper edge of the abutment shoulder 82 and thus oppose the tilting movement of the seat.

What I claim as my invention is:

1. An adjustable vehicle seat construction comprising a carriage having slides at opposite sides thereof, a seat construction, lift means intermediate said slides and seat construction, said lift means comprising a pair of bell cranks, pivot means connecting said bell cranks to said slides for rotation about a common axis extending transversely of the vehicle, lift pins carried by said bell cranks remote from said pivot means, depending portions of said seat construction having elongated generally horizontal slots receiving said pins, a torsion tube receiving the inner ends of said pins and adapted to transmit movement from a first one of said pair of bell cranks to the second one, a nut supporting arm fixed to the exterior surface of said tube spaced from the end of said tube and adjacent said first bell crank, a nut pivoted between said arm and said first bell crank, a threaded shaft engaged in said nut, said pins being non-rotatively fixed to said bell cranks and to said torsion tube, the pin connected to said first bell crank extending into said tube beyond said arm and interfitting in reinforcing relation thereto.

2. An adjustable vehicle seat support comprising pairs of front and rear support brackets each having a pair of vertically spaced slide blocks adjacent its upper end, a pair of slides of generally C-shaped cross-section each of which receives pairs of front and rear slide blocks to support the slides for longitudinal sliding movement, said front support brackets being of generally L-shaped cross-section having upwardly extending vertical portions carrying said blocks and laterally inwardly extending horizontal portions adapted to be secured to the floor of a vehicle beneath a vehicle seat supported thereby, said front support brackets being formed of sheet metal and each having an abutment surface located just below the position occupied by the front end of the associated slide when in its forward position to engage the underside of the front end of said slide upon failure of the guiding connection between the guide blocks carried by the front seat support brackets and the front portion of the slides in which said last mentioned blocks are received, the front ends of the horizontal portions of said brackets being bent upwardly into substantially vertical positions to constitute said abutments.

* * * * *